United States Patent
Nakamura

(10) Patent No.: US 11,370,084 B2
(45) Date of Patent: Jun. 28, 2022

(54) CUTTING BLADE SHAPING METHOD

(71) Applicant: DISCO CORPORATION, Tokyo (JP)

(72) Inventor: Masaru Nakamura, Tokyo (JP)

(73) Assignee: DISCO CORPORATION, Tokyo (JP)

(*) Notice: Subject to any disclaimer, the term of this patent is extended or adjusted under 35 U.S.C. 154(b) by 742 days.

(21) Appl. No.: 16/386,800

(22) Filed: Apr. 17, 2019

(65) Prior Publication Data
US 2019/0314953 A1   Oct. 17, 2019

(30) Foreign Application Priority Data
Apr. 17, 2018   (JP) ............................. JP2018-079167

(51) Int. Cl.
| | |
|---|---|
| *B24B 53/12* | (2006.01) |
| *B23K 26/53* | (2014.01) |
| *B24B 53/04* | (2012.01) |
| *B24B 53/017* | (2012.01) |
| *B23K 103/00* | (2006.01) |

(52) U.S. Cl.
CPC .............. *B24B 53/12* (2013.01); *B23K 26/53* (2015.10); *B24B 53/017* (2013.01); *B24B 53/04* (2013.01); *B23K 2103/50* (2018.08)

(58) Field of Classification Search
CPC ....... B24B 53/12; B24B 53/017; B24B 53/04; B24B 53/07; B24B 1/00; B24B 3/46; B23K 26/53; B23K 2103/50; B23K 26/0006; B23K 26/0622; B23K 26/0823; B23K 26/0853; B23K 2103/54; H01L 23/49805; B23D 63/18; B23D 63/14; B23D 63/201
See application file for complete search history.

(56) References Cited

U.S. PATENT DOCUMENTS

| | | | | |
|---|---|---|---|---|
| 4,811,722 A | * | 3/1989 | Brehm | .................... B24B 53/00 451/72 |
| 7,642,174 B2 | * | 1/2010 | Kobayashi | .............. H01L 21/78 257/E21.602 |
| 10,022,838 B2 | * | 7/2018 | Akita | .................. B24B 27/0608 |
| 10,668,595 B2 | * | 6/2020 | Sekiya | .................... B24B 53/12 |

FOREIGN PATENT DOCUMENTS

| | | | | |
|---|---|---|---|---|
| JP | 2010000588 A | | 1/2010 | |
| JP | 6576135 B2 | * | 9/2019 | ............... B24B 3/36 |

* cited by examiner

*Primary Examiner* — Helena Kosanovic
*Assistant Examiner* — Yi Hao
(74) *Attorney, Agent, or Firm* — Greer Burns & Crain Ltd.

(57) ABSTRACT

A method of shaping a cutting blade, includes a modified layer forming step of forming a plurality of modified layers at different heights within a dressing member by irradiating the dressing member with a laser beam having a wavelength transmissible through the dressing member from one surface of the dressing member a plurality of times while a focusing point of the laser beam is positioned within the dressing member, and a blade shaping step of shaping the cutting blade into a predetermined shape formed by the plurality of modified layers by cutting the dressing member by the cutting blade until the cutting blade reaches the modified layers after performing the modified layer forming step.

1 Claim, 2 Drawing Sheets

CUTTING BLADE SHAPING METHOD

BACKGROUND OF THE INVENTION

Field of the Invention

The present invention relates to a method of shaping a cutting blade that cuts a workpiece by rotating at a high speed.

Description of the Related Art

In cutting a semiconductor package such as a quad flat non-leaded package (QFN package) or the like, for example, a cutting blade preferably has a flat edge shape. The edge of the cutting blade is periodically shaped by a dresser board for flat dressing (see Japanese Patent Laid-Open No. 2010-588, for example). On the other hand, also in a case of processing that removes a surface film by a cutting blade having an edge in the shape of a letter V in order to suppress peeling of the surface film, the edge shape of the cutting blade is deformed with the passage of time. Therefore shaping work needs to be performed periodically.

SUMMARY OF THE INVENTION

However, in existing cutting blade shaping, it is necessary to prepare, in advance, both a dresser board for shaping into a flat edge shape and a dresser board for shaping into an edge shape in the form of a V. Thus, in the past, there has been a problem in that a burden of preparing dresser boards is increased according as the number of variations in the edge shape to be shaped is increased.

It is accordingly an object of the present invention to provide a cutting blade shaping method that can alleviate a burden of preparing dressing members in advance when cutting blades have a plurality of types of edge shapes.

In accordance with an aspect of the present invention, there is provided a method of shaping a cutting blade, the method including a modified layer forming step of forming a plurality of modified layers at different heights within a dressing member by irradiating the dressing member with a laser beam having a wavelength transmissible through the dressing member from one surface of the dressing member a plurality of times while a focusing point of the laser beam is positioned within the dressing member, and a blade shaping step of shaping the cutting blade into a predetermined shape formed by the plurality of modified layers by cutting the dressing member by the cutting blade until the cutting blade reaches the modified layers after performing the modified layer forming step.

According to this method, it is possible to form the modified layers in the dressing member according to a desired edge shape of the cutting blade, and shape the cutting blade by such modified layers. Consequently, when cutting blades have a plurality of types of edge shapes, it becomes unnecessary to prepare dressing members for the respective shapes in advance. Thus, a burden of preparing the dressing members can be alleviated, and the plurality of types of cutting blades can be shaped easily.

According to the present invention, it is possible to alleviate a burden of preparing dressing members in advance when cutting blades have a plurality of types of edge shapes.

The above and other objects, features and advantages of the present invention and the manner of realizing them will become more apparent, and the invention itself will best be understood from a study of the following description and appended claim with reference to the attached drawings showing a preferred embodiment of the invention.

DETAILED DESCRIPTION OF THE PREFERRED EMBODIMENT

A cutting blade shaping method according to an embodiment will hereinafter be described with reference to the accompanying drawings of FIGS. 1 to 4B. The cutting blade shaping method according to the present embodiment performs the following steps in the following order: a modified layer forming step of forming a modified layer within a dressing member; and a blade shaping step of shaping a cutting blade by using a dressing member. The steps to be described in the following are a mere example, and are not limited to this configuration.

Figure 1:
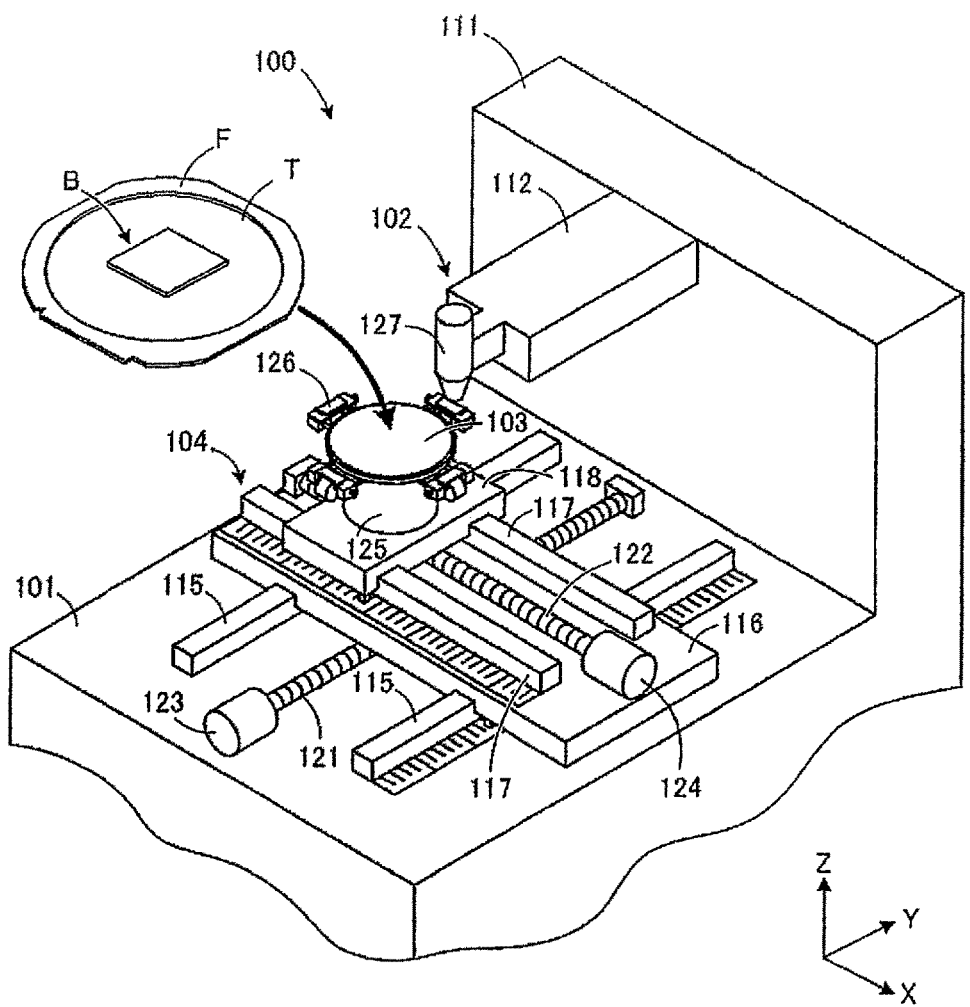
FIG. 1 is a perspective view of a laser processing apparatus used in a modified layer forming step according to an embodiment.

FIG. 1 is a perspective view of a laser processing apparatus used in the modified layer forming step according to the embodiment. First, the modified layer forming step is performed by a laser processing apparatus 100 depicted in FIG. 1. Incidentally, the laser processing apparatus according to the present embodiment is not limited to the configuration depicted in FIG. 1. The laser processing apparatus may have any configuration as long as the laser processing apparatus is able to form a modified layer in a dressing member.

The laser processing apparatus 100 is configured to process a dressing member (dresser board) B while moving a laser processing unit 102 applying a laser beam and a chuck table (holding means) 103 holding the dressing member B relative to each other. Incidentally, though the dressing member B is not particularly limited, the dressing member B is, for example, formed by a glass plate, a silicon wafer as a dummy, or the like.

The laser processing apparatus 100 has a base 101 in the shape of a rectangular parallelepiped. Disposed on a top surface of the base 101 is a chuck table moving mechanism 104 that processing-feeds the chuck table 103 in an X-axis direction and indexing-feeds the chuck table 103 in a Y-axis direction. A standing wall portion 111 is erected in the rear of the chuck table moving mechanism 104. An arm portion 112 projects from a front surface of the standing wall portion 111. The laser processing unit 102 is supported by the arm portion 112 so as to be opposed to the chuck table 103.

The chuck table moving mechanism 104 includes a pair of guide rails 115 disposed on the top surface of the base 101 and parallel with the X-axis direction and a motor-driven X-axis table 116 slidably installed on the pair of guide rails 115. The chuck table moving mechanism 104 also includes a pair of guide rails 117 disposed on a top surface of the X-axis table 116 and parallel with the Y-axis direction and a motor-driven Y-axis table 118 slidably installed on the pair of guide rails 117.

The chuck table 103 is disposed above the Y-axis table 118. Incidentally, a nut portion not depicted in the figure is formed on each of the back sides of the X-axis table 116 and the Y-axis table 118, and ball screws 121 and 122 are screwed into these nut portions. Driving motors 123 and 124 coupled to one end portions of the ball screws 121 and 122 are rotation-driven. The chuck table 103 is thereby moved in the X-axis direction and the Y-axis direction along the guide rails 115 and 117.

The chuck table 103 is formed in the shape of a disk. The chuck table 103 is disposed so as to be rotatable on a top surface of the Y-axis table 118 via a table 125. A suction surface is formed by a porous ceramic material on a top surface of the chuck table 103. Four clamp parts 126 are arranged on the periphery of the chuck table 103. When the four clamp parts 126 are driven by an air actuator (not depicted), a ring frame F on the periphery of the dressing member B is held and fixed from four directions.

The laser processing unit 102 has a processing head 127 disposed at an end of the arm portion 112. An optical system of the laser processing unit 102 is disposed within the arm portion 112 and the processing head 127. The processing head 127 condenses a laser beam emitted from a laser oscillator not depicted by a condensing lens, and laser-processes the dressing member B held on the chuck table 103. In this case, the laser beam has a wavelength transmissible through the dressing member B, and is adjusted in the optical system so as to be condensed with a focusing point positioned within the dressing member B.

The application of the laser beam forms a modified layer R (see FIG. 2) within the dressing member B. The modified layer R refers to a region that has a physical property such as density, an index of refraction, mechanical strength, or the like made different from the periphery thereof within the dressing member B by the application of the laser beam, and consequently has a strength lower than the periphery thereof. The modified layer R is, for example, a melting-processed region, a crack region, a breakdown region, a refractive index changed region, or may be a region in which these regions are mixed with each other.

In the modified layer forming step according to the present embodiment, the dressing member B supported by the ring frame F and an adhesive tape T is conveyed to the laser processing apparatus 100. The dressing member B is held on the chuck table 103 of the laser processing apparatus 100 via the adhesive tape T, and the ring frame F on the periphery of the dressing member B is held by the clamp parts 126.

An emission aperture of the processing head 127 of the laser processing unit 102 is positioned directly above a planned position where a modified layer R (see FIG. 2) is to be formed in the dressing member B in a state of being held on the chuck table 103. A laser beam is thereafter applied from the processing head 127 to an upper surface (one surface) of the dressing member B.

Then, the processing head 127 is moved in the X-axis direction relative to the chuck table 103 while the height position of the focusing point of the laser beam is maintained at a fixed position. A modified layer R is thereby formed in parallel with the X-axis direction within the dressing member B. The repetition frequency, power, and processing feed speed of the laser beam at this time are set according to conditions such as the material of the dressing member B and the like.

Figure 2:
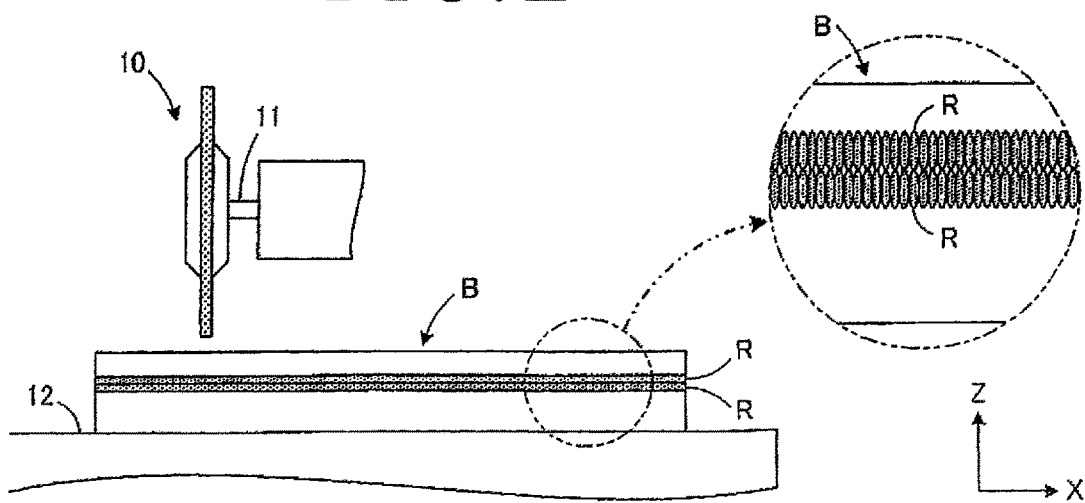
FIG. 2 is a partially sectional side view of a dressing member in which modified layers are formed and a cutting blade.

As depicted on an enlarged scale in FIG. 2, in the modified layer R, a plurality of laser spots are formed at each pulse pitch based on the wavelength of the laser beam within the dressing member B. In other words, the continuous application of the laser beam forms the modified layer R in a state in which a plurality of laser spots are adjacent to each other along the X-axis direction. In the drawing, the shape of the laser spots is formed in an elliptic shape. However, without being limited to this, the shape of the laser spots can be variously changed to be a circular shape, a square shape, a rounded quadrilateral shape, an elongated hole shape, or the like.

After the formation of the modified layer R extending in the X-axis direction at a predetermined position, the application of the laser beam is stopped, and the chuck table 103 and the processing head 127 are moved relative to each other (indexing feed) in the Y-axis direction. An amount of indexing feed at this time is determined according to the size and interval in the Y-axis direction of the laser spots. Next, a plurality of laser spots are similarly formed along the previously formed modified layer R adjacent in the Y-axis direction, so that a modified layer R extending in the X-axis direction is newly formed. Also at this time, the height position of the focusing point of the laser beam is maintained at a fixed position. The laser beam is applied a plurality of times by repeating such operation, so that the modified layers R are formed at fixed height positions within a thickness in an entire region or a partial region of the dressing member B as viewed from above.

The formation of such a modified layer R is performed a plurality of times while the position of the focusing point of the laser beam is changed. Specifically, a new modified layer R is formed at a height position different from that of the modified layer R already formed within a thickness of the dressing member B, and consequently a plurality of modified layers R (two modified layers R in FIG. 2) are formed within the dressing member B. The two modified layers R in FIG. 2 are formed so as to be adjacent to each other in the thickness direction of the dressing member B. However, the modified layers R are not precluded from being formed so as to be separated from each other.

Figure 3A:
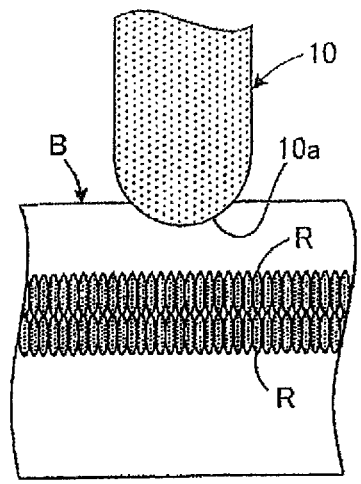
FIGS. 3A to 3C are sectional views depicting an example of a blade shaping step according to the embodiment.
Figure 3B:
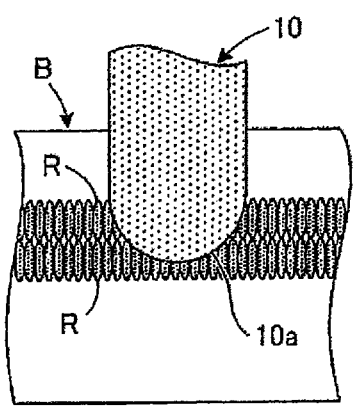
Figure 3C:
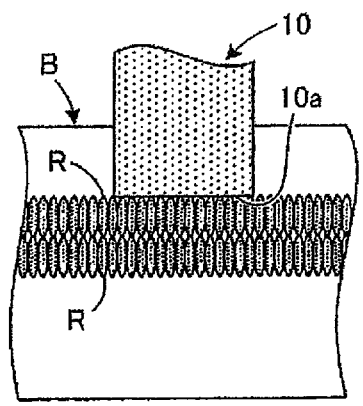

The blade shaping step is performed after the modified layer forming step is performed as described above. As depicted in FIG. 2, a cutting blade 10 is provided to an end of a rotatable spindle shaft 11. The cutting blade 10 is, for example, formed in the shape of a disk by solidifying diamond abrasive grains by a resin bond. The dressing member B is held on a holding table 12 moved in the X-axis direction and the Y-axis direction by a moving mechanism (not depicted). The cutting blade 10 is then positioned at a predetermined position directly above the dressing member B. Thereafter, as depicted in FIG. 3A and FIG. 3B, the cutting blade 10 is lowered, and the dressing member B is cut until a lower edge of the cutting blade 10 rotated at high speed reaches the modified layer R from above the dressing member B. Then, as depicted in FIG. 3C, an edge surface 10a of the cutting blade 10 is gradually ground down, and the edge surface 10a is brought close to a flat shape. Flat dressing that shapes angular portions of the cutting blade 10 to a right angle is thus performed.

Here, in the dressing member B depicted in FIGS. 3A to 3C, each of the plurality of modified layers R is formed at a same height position, and the upper surface of a modified layer R at a highest position is also formed to be horizontal and flat. In other words, the plurality of modified layers R are formed for flat dressing in the modified layer forming step, and shaping that makes the edge surface 10a of the cutting blade 10 flat is performed in the subsequent blade shaping step. Hence, when the plurality of modified layers R are formed in another configuration or shape, the edge surface 10a of the cutting blade 10 can be shaped into the other formed shape. For example, as depicted in FIG. 4A and FIG. 4B, a variation that forms a plurality of modified layers R in a dressing member B is adopted.

Figure 4A:
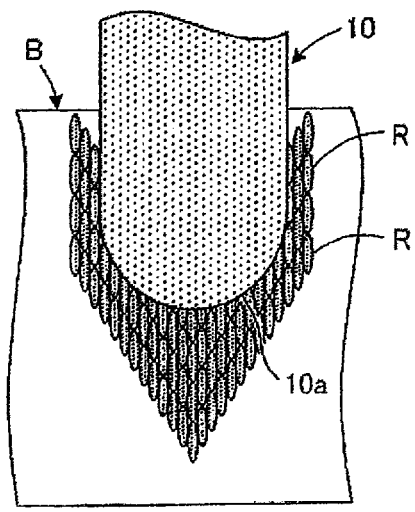
FIG. 4A and FIG. 4B are sectional views depicting another example of the blade shaping step according to the embodiment.
Figure 4B:
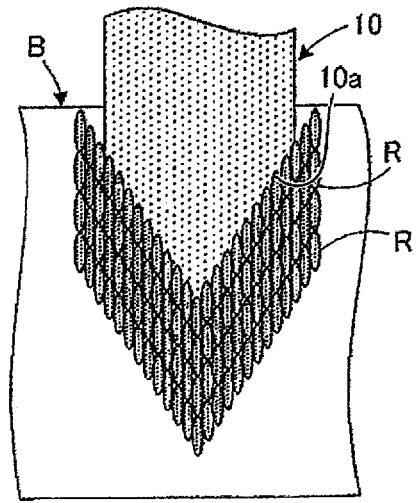

In FIG. 4A and FIG. 4B, each of the plurality of modified layers R is formed in the shape of a letter V. Specifically, when the laser beam is applied while the processing head 127 is moved in the X-axis direction relative to the chuck table 103, the height position of the focusing point of the processing head 127 is set so as to be gradually lowered for each adjacent laser spot, and subsequently become gradually higher. Then, four such modified layers R are formed so as to be superposed on each other in a height direction within the dressing member B.

When the blade shaping step is performed as in the foregoing for the thus formed dressing member B, as depicted in FIG. 4B, the edge surface 10a of the cutting blade 10 is ground down according to the shape of the modified layers R, and the edge surface 10a is shaped so as to be pointed in the shape of a letter V.

As described above, according to the present embodiment, it is possible to easily fabricate the dressing member B in which the form of the modified layers R is changed according to the shape of the edge surface 10a of the cutting blade 10 after shaping. Hence, even when there are a plurality of variations in the shape of the edge surface 10a of the cutting blade 10, it is possible to eliminate a need for preparing dressing members including different shapes for the respective shapes in advance. Thus, in performing cutting processing by the cutting blade 10, a burden of preparing a dressing member B including a different shape can be alleviated, and work efficiency can be improved.

In addition, because the modified layers R are formed in a middle in the thickness direction of the dressing member B, modified layers R not only in a flat shape but in various shapes can be formed easily, and the modified layers R can be protected so as not to be exposed before shaping.

The present inventor found that in a case where a plate-shaped workpiece is cut by the cutting blade 10 as described above, when there is a part in which a modified layer R as described above is formed within the plate-shaped workpiece, an amount of wear of the cutting blade 10 is increased due to the cutting of the modified layer R. With attention directed to the fact that an amount of such wear is empirically increased, the modified layers R are formed so as to be able to be used for shaping (dressing) of the cutting blade 10, and provisions for cutting blades 10 in many shapes are made more promptly and more easily by forming the modified layers R in the dressing member B as described above.

It is to be noted that while the modified layers R are formed in a flat shape or the shape of a letter V in the dressing member B in the foregoing embodiment, the modified layers R are not limited to this, but can be changed variously according to the shape of the cutting blade 10. For example, the modified layers R may be formed in the dressing member B so as to form a shape having a step formed on at least one of both surfaces of the cutting blade 10.

In addition, embodiments of the present invention are not limited to the foregoing embodiment, but may be changed, replaced, and modified in various manners without departing from the spirit of technical ideas of the present invention. Further, when the progress of a technology or another derived technology can realize a technical idea of the present invention in a different manner, the technical idea of the present invention may be carried out by using the method. Hence, claim covers all embodiments that can be included within the scope of the technical ideas of the present invention.

As described above, the present invention is useful when cutting blades have a plurality of types of edge shapes and each of the cutting blades is to be shaped.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A method of shaping a cutting blade, the method comprising:
   a modified layer forming step of forming a plurality of modified layers at different heights within a dressing member by irradiating the dressing member with a laser beam having a wavelength transmissible through the dressing member from one surface of the dressing member a plurality of times while a focusing point of the laser beam is positioned within the dressing member; and
   a blade shaping step of shaping the cutting blade into a predetermined shape formed by the plurality of modified layers by cutting the dressing member by the cutting blade until the cutting blade reaches the modified layers after performing the modified layer forming step.

* * * * *